(12) United States Patent
Gordon et al.

(10) Patent No.: US 9,911,151 B1
(45) Date of Patent: Mar. 6, 2018

(54) SYSTEM AND METHOD OF INVENTORY MANAGEMENT AND MARKETING FOR VEHICLES

(71) Applicant: AutoNation Holding Corp., Fort Lauderdale, FL (US)

(72) Inventors: RonMcCrea Gordon, Pembroke Pines, FL (US); Mayra Regalado, Plantation, FL (US)

(73) Assignee: AutoNation Holding Corp., Fort Lauderdale, FL (US)

(*) Notice: Subject to any disclaimer, the term of this patent is extended or adjusted under 35 U.S.C. 154(b) by 890 days.

(21) Appl. No.: 14/288,586

(22) Filed: May 28, 2014

Related U.S. Application Data

(60) Provisional application No. 61/831,695, filed on Jun. 6, 2013.

(51) Int. Cl.
*G06Q 30/00* (2012.01)
*G06Q 30/06* (2012.01)
*G06Q 20/20* (2012.01)
*G06Q 10/08* (2012.01)

(52) U.S. Cl.
CPC ......... *G06Q 30/0639* (2013.01); *G06Q 10/08* (2013.01); *G06Q 20/203* (2013.01); *G06Q 30/0623* (2013.01); *G06Q 30/0643* (2013.01)

(58) Field of Classification Search
CPC ........... G06Q 30/06; G06Q 30/0601–30/0643; G06Q 30/08; G06Q 10/08; G06Q 10/087; G06Q 20/203
See application file for complete search history.

(56) References Cited

U.S. PATENT DOCUMENTS

| | | | |
|---|---|---|---|
| 6,977,612 B1 | 12/2005 | Bennett | |
| 7,323,989 B2 | 1/2008 | Allen | |
| 7,511,619 B2 | 3/2009 | Allen | |
| 8,223,010 B2 | 7/2012 | Petite et al. | |
| 8,438,048 B1 | 5/2013 | Benavides | |
| 2005/0083212 A1* | 4/2005 | Chew | G08G 1/14 340/932.2 |
| 2005/0285782 A1 | 12/2005 | Bennett | |
| 2006/0187043 A1 | 8/2006 | Allen | |
| 2007/0057817 A1* | 3/2007 | Aman | G08G 1/017 340/933 |

(Continued)

FOREIGN PATENT DOCUMENTS

EP 1836693 B1 7/2009

OTHER PUBLICATIONS

"Smart Parking Applications Using RFID Technology". Zeydin PALA and Nihat INAN. IEEE Xplore Conference. Oct. 2007. (Year: 2007).*

*Primary Examiner* — William J Allen
(74) *Attorney, Agent, or Firm* — Jones Day

(57) ABSTRACT

A system includes location detectors and a server. The location detectors are supported by respective vehicles that are for sale on a dealership lot. Each detector detects its location and wirelessly transmits location data indicating the location. The server receives the transmitted location data from each detector, and maintains a database of each vehicle's location in accordance with associated detector's location. The server receives selection criteria from a mobile communication device. The server selects a vehicle from among the vehicles based on the selection criteria. The server transmits the location of the selected vehicle to the communication device.

19 Claims, 4 Drawing Sheets

(56) References Cited

U.S. PATENT DOCUMENTS

| | | |
|---|---|---|
| 2007/0171069 A1 | 7/2007 | Allen |
| 2007/0229236 A1 | 10/2007 | Mercer et al. |
| 2008/0231446 A1* | 9/2008 | Cresto ................... G06Q 10/087 340/572.1 |
| 2010/0094482 A1 | 4/2010 | Schofield et al. |
| 2011/0295724 A1 | 12/2011 | Hill |
| 2012/0089470 A1 | 4/2012 | Barnes, Jr. |
| 2012/0284087 A1 | 11/2012 | Pollak |
| 2013/0066667 A1* | 3/2013 | Gulec ..................... G06Q 10/06 705/7.13 |
| 2014/0074667 A1* | 3/2014 | Smith ....................... G01S 5/12 705/28 |
| 2014/0100997 A1* | 4/2014 | Mayerle ............. G06Q 30/0643 705/27.2 |
| 2014/0156459 A1* | 6/2014 | Zises .................. G06Q 30/0623 705/26.61 |
| 2014/0207615 A1* | 7/2014 | Li ....................... G06Q 30/0623 705/26.61 |
| 2014/0279293 A1* | 9/2014 | Morgan ............... G06Q 10/087 705/28 |
| 2015/0199751 A1* | 7/2015 | Bryant ............... G06Q 30/0643 705/27.2 |

* cited by examiner

SYSTEM AND METHOD OF INVENTORY MANAGEMENT AND MARKETING FOR VEHICLES

CROSS-REFERENCE TO RELATED APPLICATION

This application claims priority to U.S. Provisional Patent No. 61/831,695, filed Jun. 6, 2013, hereby incorporated herein by reference.

TECHNICAL FIELD

This relates to managing inventory of vehicles and marketing of the vehicles.

BACKGROUND

Automobile (car) dealerships have vehicles for sale on a parking lot of the dealership Dealerships have an inventory management system for keeping track of which vehicles are on the lot.

SUMMARY

A system includes location detectors and a server. The location detectors are supported by respective vehicles that are for sale on a dealership lot. Each detector detects its location and wirelessly transmits location data indicating the location. The server receives the transmitted location data from each detector, and maintains a database of each vehicle's location in accordance with associated detector's location. The server receives selection criteria from a mobile communication device. The server selects a vehicle from among the vehicles based on the selection criteria, and transmits the location of the selected vehicle to the communication device.

In an example, the selection criterion comprises at least one of price, model and color. The mobile communication device is a smart phone. A software application is executed by the mobile communication device to display an image of the vehicles and to display, on the image, an indication of which of the displayed vehicles is the selected vehicle. The application also displays an image of a subset the vehicles that does not include the selected vehicle, and displays, on the image, an indication of a direction where the selected vehicle is located.

In an example, the vehicles are located in a common lot, and a sign adjacent the lot contains a QR code for downloading the application to the communication device. The user input includes an image captured by the communication device of one of the vehicles, and the selecting includes determining, based on the image, which of the vehicles the image is of Each detector detects the respective location based on GPS. Each detector transmits the position data through a cellular network to the server. The application transmits the location of the communication device to the server, and the server monitors which of the vehicles is near the communication device and cooperates with the application to display descriptive data about the vehicle. The server uses the received location data to take an inventory of the vehicles.

DESCRIPTION

Figure 1:
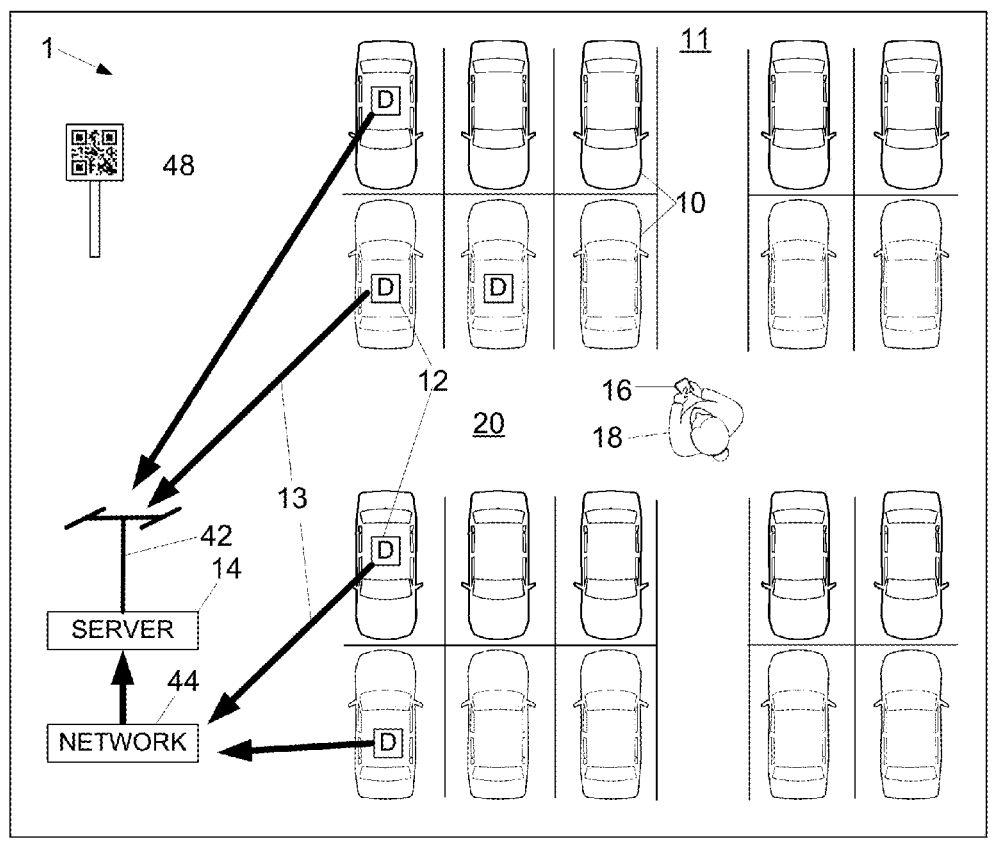
FIG. 1 is a direct overhead view of a sales lot of a car dealership that uses a system for managing inventory of cars on the lot and for marketing the cars to customers, with each car supporting a location detector.

FIG. 1 is direct overhead view of an example system 1 for tracking inventory of vehicles and marketing of the vehicles. The system 1 includes a parking lot 11 (car lot) of an automobile dealership and vehicles 10 that are for sale by the dealership. Each vehicle 10 supports a location detector 12 (tag) that detects its (the detector's) location and wirelessly transmits (arrows 13) the location to a server 14 of the dealership. The server 14 receives, from a mobile communication device 16 of a prospective customer 18 (user), user input of criteria for selecting a vehicle. The server 14 selects a vehicle 10 from the lot 11 based on the criteria, and transmits the location of the selected vehicle 10 to the mobile device. This enables the customer 18 to find the selected vehicle 10 on the lot 11 without assistance from a salesman.

The vehicles 10 in this example are cars that are parked in double rows, with aisles 20 in-between. Each car 10 supports a location detector 12 that is located either inside or outside the car 10. The detector 12 can be, for example, attached to the car's outer surface (top, bottom, front, rear or side) or inner surface.

Figure 2:
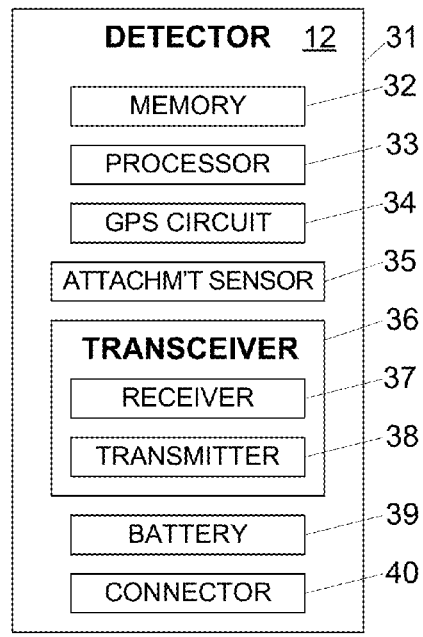
FIG. 2 is a schematic view of components of the detector.

FIG. 2 is a schematic view of components of the example detector 12. The detector 12 includes electrical circuitry housed in a housing 31 (casing). A non-transient hardware processor-readable data storage medium (memory) 32 stores data and software instruction code. A processor 33 communicates with other electronic components of the detector 12 and executes the code to perform (including controlling the other components to perform) functions of the detector 12. A GPS circuit 34 receives satellite-transmitted GPS signals and processes them to determine the detector's (and thus the car's) geographic location.

Figure 3:
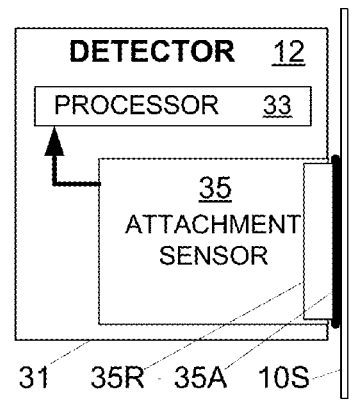
FIG. 3 is a schematic view of one of the components shown in FIG. 2.

An attachment sensor 35 detects whether the detector 12 is adhered to a car surface. An example configuration of this sensor 35 is shown in FIG. 3. The sensor 35 includes a resilient component 35R (e.g., pad or button) with an adhering surface 35A (e.g., double sided adhesive tape or magnet) that projects slightly outward from the detector housing 31. To attach the detector 12 to a car surface 10S, a user orients the adhesive surface 35A against the car surface 10S. The user then presses the detector 12 against the car surface 105, which adheres the adhering 35S to the car surface 105. The sensor 35 senses the brief application, and then release, of compression of the resilient component 35R, and communicates this to the processor 33, which indicates to the processor 33 that the detector 12 is attached. When the user pulls the detector 12 off the car surface 105, the sensor 35 senses the brief application, and then release, of tension of the resilient component 35R, and communicates this to the processor 33, which indicates to the processor 33 that the detector 12 is detached.

As shown in FIG. 2, the detector's circuitry further includes a transceiver 36 with a receiver 37 and a transmitter 38. Before being placed in service (attached to a car), the receiver 37 may download, from the server 14, under control of a worker of the dealership, both (1) descriptive data of the associated car (e.g., the car's make, model, body type, trim level, color, year), and (2) instructions to the detector 12 (e.g., which of the car-related data to transmit, how often to transmit it, what transmission signal format to use). The instructions can include a unique identification (ID) number the server 14 has assigned to the detector 12. The detector 12 would then append its ID to each transmission it sends. The detector 12 would also search for its ID number in messages detected as sent from the server 14 to determine whether the instructions are directed to itself or to another detector. The detector 12 stores the instructions and data in its memory 32. The transmitter 38 later transmits the car-related data and GPS location data to the server 14 in accordance with the received instructions.

An electric-power storage device 39 (e.g., rechargeable battery), within the housing 31, powers the electronic circuitry.

The detector 12 may include an electrical connector 40 (terminal, plug) to be electrically connected to the car's engine control unit (ECU) (computer). For example, the connector 40 may be plugged into the car's OBD port under the dashboard. Alternatively, the connector 40 may include connectors configured to be connected to OBD lines, or ECU, under the car's hood, which would render the detector 12 less likely to be noticed and stolen. From the OBD port (or lines), the detector 12 may receive (1) the vehicle's vehicle identification number (VIN), which includes descriptive data about the car such the car's make, model, body type, trim, engine type and year; (2) data relating to current operation of the car, such as car speed, accelerator position, engine temperature, engine torque and engine run time; (3) data relating to malfunctions of the car, such as malfunction light status; and (4) electrical charge current to power the detector 12 and recharge the battery 39.

If the detector 12 uses an OBD port, then it might not require an ID to be assigned to it by the server 14. The detector's ID can be the VIN that the detector 12 downloads from the OBD port. As soon as the detector 12 is plugged into a OBD port, the detector 12 may transmit, to the server 14, the new VIN and its location, along with an indication that this is a newly associated OBD port.

An alternative to keeping the detector 12 constantly attached to the OBD port is to attach the detector 12 to the OBD port only long enough for the detector 12 to download and store the car's VIN. The detector 12 may then be adhered to a less visible location of the car 10.

When plugged into the OBD port, the detector 12 may store the downloaded VIN in the detector's memory 32. When later detached from the OBD port, the detector 12 may continually transmit the stored VIN along with the detector's location and an indication that it has been detached. This prompts the server 14 to determine whether the detector 12 has been stolen or instead removed by a dealership worker. To power this antitheft feature when the detector 12 is detached from (and thus not receiving power from) the OBD port, the detector 12 should include a battery or at least a power capacitor. A detector that is not electrically connected to their associated cars may be secured by a fastener (e.g., screw or adhesive 35A in FIG. 3) to the car surface 10, and can transmit the theft-related indication along with the GPS data when it detects it has been detached.

When the detector 12 is attached to the OBD port and powered from the OBD port, the detector 12 may not need its own internal battery, although a small battery or capacitor may be included to provide short term (e.g., 5 minutes) of communication time after the detector 12 is detached. Since the detector may retrieve the car-related data at any time from the OBD port, the car-related data might not have to be stored in the detector's memory 32. Besides requiring fewer detector components, the OBD approach eliminates the need for user entry of data into the detector 12. It also ensures that the car data that the detector 12 transmits to the server 14 is of the car that it is actually attached to.

As shown in FIGS. 1-2, the transceiver 36 of the detector 12 can communicate directly (i.e., not through a repeater or network) with an antenna 42 of the server 14, as portray by arrows 13 in FIG. 1, such as with a walkie-talkie type system (e.g., FRS and GMRS) or a CB (citizen's band) radio system. To reduce power consumption, the data to the server 14 can be transmitted in brief high-power data bursts. Alternatively, the transceiver 36 can communicate with the server 14 through a network 44. For example, the detector 12 may communicate over a wireless cellular network with the server 14, such as by the detector 12 containing a SIM card to text message the server 14 over a dedicated telephone number, or through a wireless Internet network such as WLAN or WiFi.

The cellular approach provides essentially nationwide tracking range, whereas direct wireless communication covers a radius, centered on the server's antenna 42, of typically only 10-20 miles. However, the direct wireless communication approach may be cheaper to maintain since it does not require a wireless service provider subscription. And a 10-20 mile radius might be satisfactory for dealership purposes, where the car might be expected to remain within ten miles from the dealership lot 11 until it is sold. The dealership may increase the communication range by raising the server antenna's height and optimizing its design, which is cost-effective to do in a dealership scenario where one fixed antenna serves all cars 10 on the lot 11.

The server 14 might be a computer or network of computers, including a non-transient hardware computer-readable data storage medium (e.g., hard drive) that stores data and software instruction code, and a processor that executes the code to perform functions of the server 14.

The data may be transmitted at a longer uniform time interval (such as once an hour or once a day) when the car 10 is stationary, and at a shorter uniform time interval (such as once a second or once a minute) when the car is moving. The time intervals may be controlled by instructions from the server 14 to the detector 12 before the detector 12 is placed in service. The data may be transmitted also each time the detector 12 is polled by the server 14 (by the detector wirelessly receiving an interrogation instruction from the server 14).

If the detector 12 includes the OBD terminal 40 and receives its car-related data from the car's electronics and the polling capability is not required by the user, then the receiver 37 might be omitted from the detector 12. The detector 12 may be programmed to transmit the car-related data at the longer time interval when the car is not moving, at the shorter time interval when the car is moving, and upon detecting certain transmission-triggering events. These events may include a change in a car operational parameter (e.g., engine startup or shutdown, application of accelerator, application of brake), each additional set distance traveled (e.g., each additional mile traveled), and detachment of the detector 12 from the car 10. Instructions (e.g., assigned detector ID number, time intervals and triggering events designations) may be downloaded to the detector 12 through a wired link terminal (e.g., USB port) of the detector.

The server 14 might periodically receive, from each detector 12, (1) the detector's ID (which might comprise the associated car's VIN); (2) data describing the car (which might be derived from the VIN); (2) data relating to operation of the car (which might be derived from OBD data); (3) data relating to malfunctions of the car (which might be derived from OBD data); (4) GPS location of the detector, and (5) and indications whether the detector is mechanically attached to the car and electrically attached to the car circuitry. The server 14 stores this data in a database in its storage medium.

The server 14 may share the above data, regarding its cars 10, to prospective customers 18 through the customers' communication devices 16 (e.g., computers and smart phones). The car data can include each car's make, model, body type, trim, color, price, odometer mileage and condition, and the car's geographic (GPS) location. The customers' device 16 may be loaded with a software application (app) to enable interoperating with the server 14 to display the information on the device 16. To facilitate download of the app, a billboard 48 (sign) at the dealership lot 11 may display a large image of a QR (Quick Response) code indicating a website. A person (user) passing the dealership on a street or highway and seeing the billboard may scan (using for example a smart phone's camera) the QR code into his/her smart phone from afar. The QR code directs the smart phone to a website that downloads the app to the user's device 16.

In this example, the app and the server 14 work together to perform the following functions:

The app provides a graphical user interface (GUI) to the user through which the user enters criteria for narrowing a selection of cars, such as make, model, body type, trim, year, color and price range. The app uploads the search criteria to the server 14. The server 14 selects cars (vehicles), from among the cars on the lot 11, that match or best match the criteria.

Figure 4:
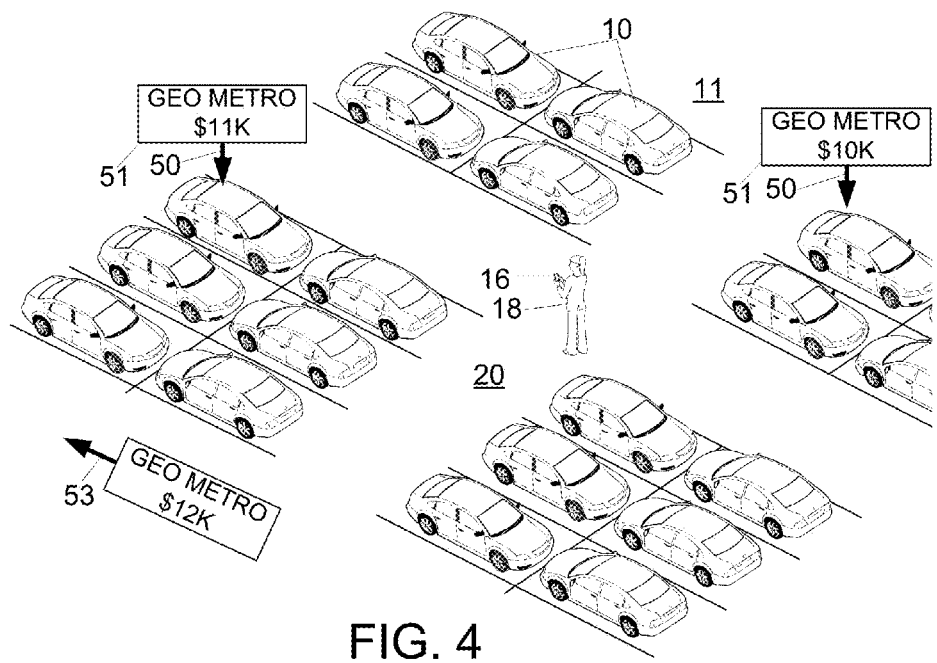
FIG. 4 is a perspective overhead view of the sales lot.

The server 14 may control the app to display, on the user's device 16, different images of the dealership lot 11 (i.e., either the entire lot or a portion of it) along with surrounding streets. A first image may provide a direct overhead view of the lot 11, as viewed straight downward, like the view of FIG. 1. A second image may provide a perspective overhead view, such as that of FIG. 4, which is viewed at a slight angle to show one end (either front or rear) of each car along with one side of the car. A third image (not shown) might be a ground level perspective view of the lot 11, as though viewed from the perspective of a person standing on the ground in the lot 11. The user, through a user input device such as mouse or touch screen, may select which of the possible images to display.

In each of the possible images, the location that each car 10 has in the image matches the car's actual current location in the lot 11. The server 14 may computer-generate each image in the following way. The server 14 has, stored in a database of its storage medium, for each car model, body type, trim and year, a stock photo (image, appearance) of the car as viewed from each of different angles. The server 14 generates each image of the dealership lot 11 by placing the respective stock photo for each car 10 in a location on the image that matches the car's actual location and orientation on the lot 11. For example, if the database indicates a silver 2005 Dodge Caravan SE is currently located in car space H5 on the lot 11, where car space H5 faces north, then the server 14, when generating the image of the lot 11, places the stock photo of a 2005 Dodge Caravan SE in spot H5 on the overhead image, color it silver and orient it to face north. The server 14 can do the same for each car 10 on the lot 11, to populate all spots on the image that it displays to the user.

The app's GUI enables the user to flip from one image (directly overhead, perspective overhead, ground level) to the next. The GUI further enables the user to zoom in and out and to move the field of view to different locations in the lot 11.

The GUI displays indications (markings) that highlight cars 10 in the image that the server 14 selected as meeting (or best meeting) the search criteria. The indication (highlighting) might be with arrows 50 pointing to the selected cars, or with circles surrounding the selected cars. The indications 50 (markings) remain adjacent their respective cars even as the images are switched from one to the other (such as from overhead to ground level), and even while an image's field of vision is zoomed and moved.

The GUI in this example further displays, adjacent (such as above) each selected car, a textual summary 51 of car data (such as make, model, body type, year, price). In some situations, there might be too many selected cars in a single view for all of their data to be displayed at once. In that case, the data of only one or some of the selected cars that appear closest to the viewer (that are in the foreground) may be shown, and not of cars appearing farther off (in the background). The amount of data for each selected car may be a function of the amount of room on the screen and the number of selected cars appearing in the image. For example, the text might include only model where five selected cars are in view, and might further include price when the image is zoomed where only three selected cars are in view, and might include all the car's data when the image is further zoomed to only one selected car is in view. The amount of data displayed may differ between cars, based on each car's location on the image. For example, cars that appear closest to the viewer may have more data displayed, and cars successively farther in the background may have successively less data displayed. As the user (using the user input device) manipulates the image to appear as though the viewer is gradually approaching a particular car, gradually more data may appear (be displayed) adjacent the car. Accordingly, the amount of data displayed regarding and adjacent a car may be a function of the car's apparent closeness to the viewer.

The indication 50 that specifies which car is selected, and the displayed data 51 regarding the car, move on the displayed image in unison with movement of the vehicle 10 on the screen as the user switches from one image type to another, and zooms or moves the field of view within an image.

While viewing the images, the user can use the input device (e.g., mouse or touch screen) to select (e.g., click on or tap on) any car on the lot 11. Under control of the server, the GUI highlights the user-selected car (such as with an arrow pointing to it), and keeps the user-selected car highlighted even as the image changes is replaced with another image or is zoomed or moved. The GUI also displays data, regarding the user-selected car, adjacent the user-selected car as described above.

If a previously selected car does not appear in the image, the app may display, on the image, an indication (e.g., arrow 53 in FIG. 4) of a direction where the selected vehicle 10 may be found. The user 16 may then adjust the field of vision in the indicated direction to bring the selected vehicle 10 into view.

The GUI may enable the user to select a GUI option to purchase the user-selected car. Since the user has actually seen the car on the computer-generated image of the parking lot 11, the user is sure that the car is on the lot and available for sale. If the car were not for sale, such as if its sale were pending with another customer, the car's displayed data would indicate that fact.

The GUI functions described above can be implemented by the user no matter where the user is, including at home. The above GUI functions give the user a view of the cars that are actually present at the dealership and shown in their actual positions on the lot 11. If the user is interested in one of the cars shown by the GUI, he/she has an incentive to travel to the dealership, since he/she knows that the car is at the dealership and even knows the car's location is on the lot 11. This incentive to travel to the dealership is greater than if the person merely saw a car of interest in an advertisement.

When the prospective user visits the dealership in person, the user can take advantage of other features of the app, as follows:

As the user 18 (FIG. 4) strolls through the aisles 20 of the lot 11, the user's smart phone device 16 continuously determines the user's GPS (geographic) location, and the app continuously transmits the user's GPS location to the server 14 (FIG. 1). The server 14 combines the user's location with the locations of the cars 10 in the lot 11, to determine which cars the user 18 is near. The server 14 and the app may cooperate to display (on the user device) descriptive data such as price about a car that the user 18 is near.

While the user is in the lot 11, the app may also display any of the computer-generated images described above: the first image (direct overhead view like that of FIG. 1), the second image (perspective overhead view like that of FIG. 4) and the third image (ground level view). But this time, each computer-generated image includes an icon of the user him/herself (labeled 18 in FIGS. 1 and 4) that illustrates the user's location within the lot 11.

The server 14 may suggest to the user additional cars that the user did not specifically select or enter criteria for. The server 14 may provide the suggestion using the arrow 50 and text 51 approach. If the car that is user-selected car or server-selected or server-suggested does not appear in the image, whether the image is the server 14 generated image or the user captured image, the app may display, on the image, an indication 53 (e.g., arrow with label) of a direction where the selected vehicle 10 may be found. The user 18 may then walk in the direction indicated by the arrow 53 to approach the car 10.

The server 14 may determine that the user is interested in a particular car based on three occurrences: (1) the user lingering in the aisle 20 by the car; (2) the user leaving the aisle 20 and standing alongside the car in the parking space; and (3) the user sitting inside the car. Each successive occurrence indicates a successively higher level of interest by the user.

When the server 14 detects any of the above three occurrences, the server 14 may automatically (without user input) control the app to display sales data about the car in the GUI of the user device 16. The GUI enables the user 16, while standing alongside the car or sitting in it, to select an option to purchase the car.

Figure 5:
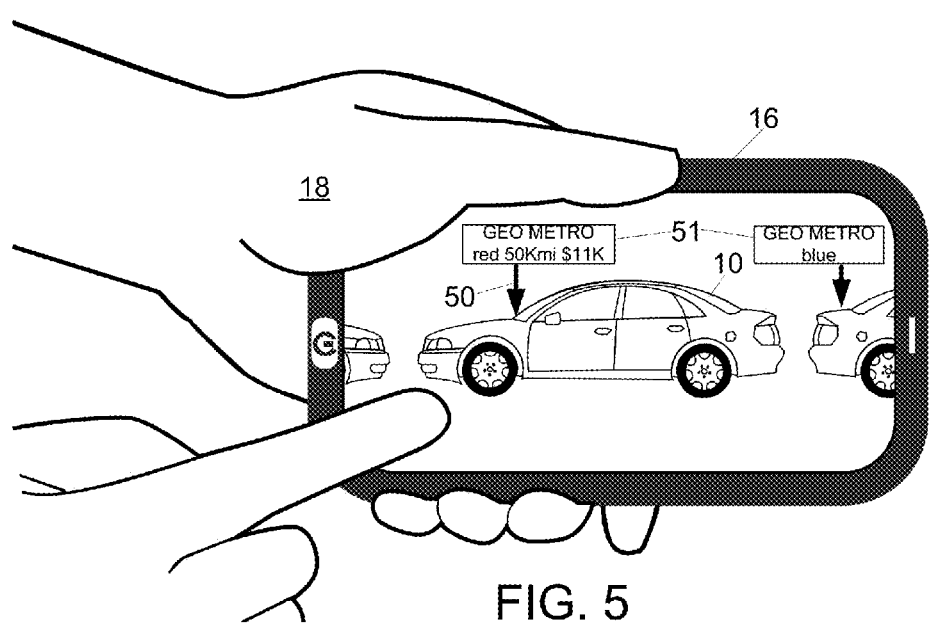
FIG. 5 is a view of a user using a smart phone to capture an image of a car on the lot.

As shown in FIG. 5, the user 16 may use a camera feature of the user device 16 to capture (scan) an image of a car 10 on the lot 11. The user may capture (scan) the image of the car from afar, including from a street outside the dealership lot 11, and select the scanned vehicle (such as by tapping the touch screen). The app will upload the image to the server 14, and the server 14 will use an image recognition software program along with the user's GPS location to identify the car in the image. The identification may be done based on the appearance (e.g., shape and color) of the car 10. To improve accuracy, each car 10 may have a unique label, such as adhered to its window or license plate area, that the server 14 may use to identify the scanned car. The server 14 may control the app to display data 51 about the scanned car in the GUI image. The GUI may enable the user to select an option to purchase the car 10 in the captured image. The user's selecting of the car from an image that the user him/herself captured may be considered as a user inputting a search criterion that narrows the search to a single car. Similarly, the server's identifying (using image recognition) the imaged car may be considered as the server selecting the car based on the search criterion. That image-captured vehicle will be portrayed as a user-selected vehicle (in terms of highlighting and providing data for) in subsequent server-generated images.

Whenever the user 18 selects a car, whether from the server-generated image or from the user-scanned image, the app enables the user to record the selected car for later recall and consideration.

The user may, at any time, select a GUI option requesting to speak to a salesperson. If the user is on the lot 11, the server 14 may dispatch a salesperson to walk to the user 18. If the user is outside the lot 11, the server 14 may dispatch a salesperson to phone the user's smart phone 16 that has the app. The server 14 informs the salesperson of the user's geographic location and phone number, and which of the cars the user has shown interest in.

The server 14 may check inventory automatically (without human intervention) at any time (even continuously) based on the data received from the detectors 12. The inventory check may be by the server 14 polling (sending interrogation signals to) the detectors 12 for their data or by waiting for their data to be received on the aforementioned periodic basis and in response to the triggering events. The server 14 may continually check the detected inventory against the dealership's administrative records of what cars should be on the lot 11.

Each salesman of the dealership may have a mobile communication device (e.g., smart phone) that constantly transmits its GPS location to the server 14, for the server 14 to monitor the location of each salesman. The server 14 may compare locations of the salesmen, the customers and the cars to each other. Based on the comparison, the server 14 may determine and record (1) which salesman is with which customer on the lot 11; (2) when the a car is moving with a salesman in it, which customer is going on a test drive; and (3) when a car moving without a salesman in it, that the car might be stolen. The server 14 may provide an alert to the dealership management of a potential theft. The ability of the server 14 to determine all of the above information automatically reduces the need for a salesman to manually record information such as which customer he/she is helping, which car he/she will test drive, which customer he/she is taking on the test drive, and in which parking space he/she left the car after the test drive.

When a repairman in the dealership's service department takes a car from the lot 11 for servicing, the server 14 will know (based on the car's GPS location) that the car is in the shop for repair, so the repairmen might not have to sign the car out. The dealership's car inventory system may include, or communicate with, the server 14. Therefore, when a salesperson checks the dealership database for the car's status and location, the server 14 will inform the salesperson the car is in the shop for repair.

The server 14 may also use the data received from the detectors 12 to make statistical analyses and reports to dealership management. For example, the received data enable the server 14 to determine which cars on the lot 11 have garnered the most customer interest (based on the three occurrences mentioned above). The dealership management may use this information to lower prices on cars that have garnered no interest over a preset number of days. The statistical reports may indicate how customer interest in a car is related to the car's parking space location in the lot 11.

When a server 14 is informed by a detector 12 that its car's engine is being started, the server 14 may check that the car's key has been checked out by a salesperson for a test drive, to ensure that the car is not being stolen.

Providing the car information as described above to the user encourages the user to periodically check the dealership's inventory, both to check for something to buy and out of curiosity. When a user is at home and bored, he/she might open the dealership app to check what new cars arrived at the dealership.

To make the matter more interesting, the app can also show the user the location of each car that is being test driven. The app, under server 14 control, may include a field of view that includes both the lot 11 and the surrounding streets. The app may show, with realistic-looking stock photos of cars, where each test-driven car is on the road. The user might take a personal interest in one of the cars for sale, such as a exceptionally sporty car, even if he/she has no intention of buy it, and periodically check the app to see where the car is now. All this keeps the dealership on the user's mind even when the user is at home or work.

Figure 6:
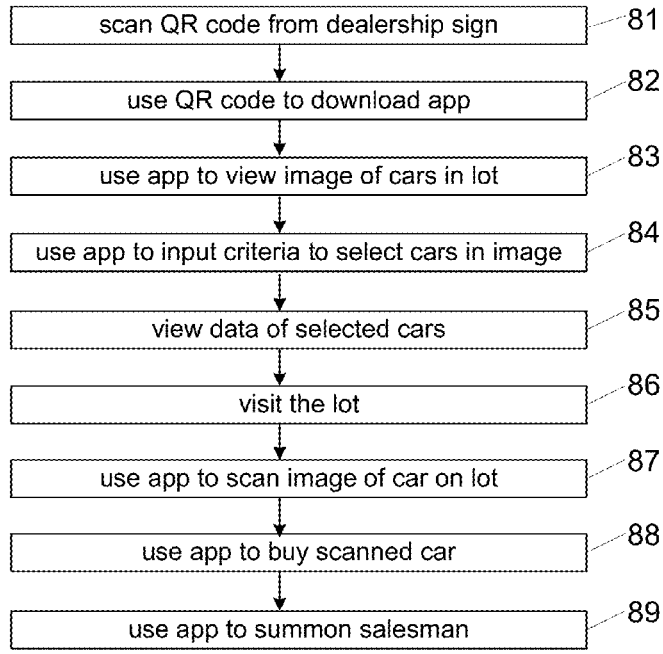
FIG. 6 is a flow chart of method steps performed by the customer using the system.

FIG. 6 is a flow chart of example method steps performed by a user using the system 1 described above. The user scans the QR code from the dealership sign (step 81); uses the code to download the app (step 82); uses the app to view am image of cars in the dealership lot 11 (step 83); uses the app to input search criteria for the server 14 to select cars from among the cars in the image (step 84); view data in the image of the server-selected cars (step 85); visits the lot (step 86); scans (captures) an image of a car on the lot (step 87); uses the app to buy the car (step 88) or to summon a salesman (step 89).

Figure 7:
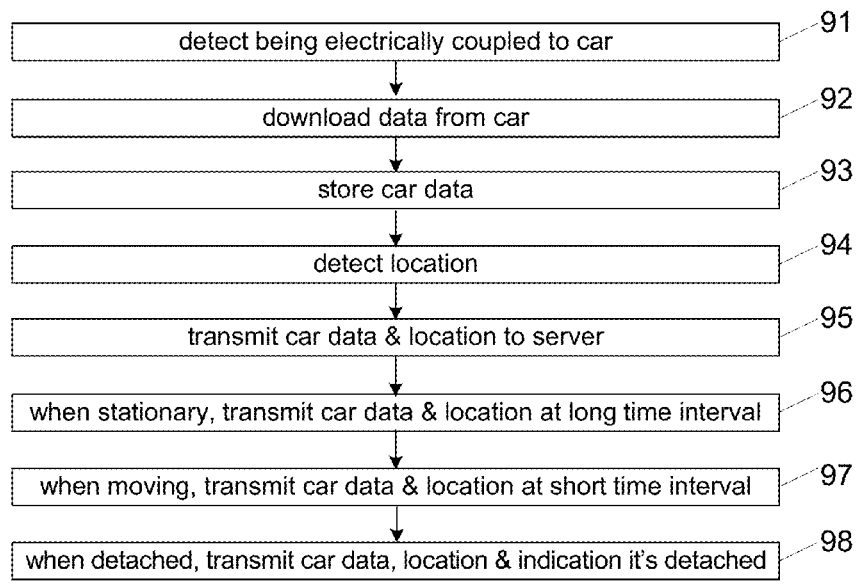
FIG. 7 is a flow chart of method steps performed by a detector of the system.

FIG. 7 is a flow chart of example method steps performed by a detector 12 of the system 1 described above. The detector 12 detects that it is being electrically coupled to a car (step 91); in response, downloads car description data from port (92); stores the car data in its memory (93); detects its geographic location (94); transmits its location, its ID and the car's data (95); while detecting it is stationary, transmits its location at a longer uniform time interval (96); while detecting it is moving, transmits operational data and location to the server at a shorter uniform time interval (97); when detecting it has been detached from the car, continually transmits its ID, its location and an indication it is detached (98).

The components and procedures described above provide examples of elements recited in the claims. They also provide examples of how a person of ordinary skill in the art can make and use the claimed invention. They are described here to provide enablement and best mode without imposing limitations that are not recited in the claims. In some instances in the above description, a term is followed by a substantially equivalent term enclosed in parentheses.

The invention claimed is:

1. A system comprising:
location detectors supported by respective vehicles that are for sale on a dealership lot, each detector being configured to detect its location and to wirelessly transmit location data indicating the location; and
a server configured to:
receive the transmitted location data from each detector,
maintain a database of each vehicle's location in accordance with associated detector's location,
receive from a mobile communication device, selection criteria,
select, based on the selection criteria, a vehicle from among the vehicles, and
transmit the location and a picture of the selected vehicle to the communication device for simultaneous display, wherein the transmitted location of the vehicle includes a parking space identifier associated with a parking space in a parking lot where the selected vehicle is currently parked;
a software application configured to be executed by the mobile communication device, the software application configured to periodically transmit location data indicating a current location of the mobile communication device to the server;
wherein the server is further configured to:
automatically select a new selected vehicle based on the periodically transmitted location data, wherein the server automatically selects the new selected vehicle based on the periodically transmitted location data indicating at least one of:
(i) that a user of the mobile communication device has been standing in a parking lot aisle where the newly selected vehicle is parked for more than a threshold period of time;
(ii) that a user of the mobile communication device has moved from a parking lot aisle to a particular parking space associated with the newly selected vehicle; and,
(iii) that the mobile communication device is inside the newly selected vehicle.

2. The system of claim 1 wherein the selection criterion comprises at least one of price, model and color.

3. The system of claim 1 wherein the mobile communication device is a smart phone.

4. The system of claim 1 further comprising a software application configured to be executed by the mobile communication device to:
display an image of the vehicles; and
display, on the image, an indication of which of the displayed vehicles is the selected vehicle.

5. The system of claim 4 wherein the image is captured by a camera of the communication device.

6. The system of claim 4 wherein the image is computer-generated by the server.

7. The system of claim 4 wherein the indication is a marking that is displayed on the screen adjacent the selected vehicle and that moves, on the screen, in unison with movement of the vehicle on the screen as field of vision of the image on the screen changes.

8. The system of claim 1 further comprising a software application configured to be executed by the mobile communication device to:
capture an image of a subset of the vehicles that does not include the selected vehicle using a camera of the communication device;

display the image of the subset of the vehicles that does not include the selected vehicle;

determining a current location of the communication device based on the subset of vehicles in the image; and display, on the image, an indication of a direction where the selected vehicle is located based on the determined location of the communication device.

9. The system of claim 8 wherein the image is computer-generated by the server.

10. The system of claim 1 wherein the system includes, adjacent the vehicles, a sign that contains a QR code for downloading the application to the communication device.

11. The system of claim 1 wherein the user input includes an image captured by the communication device of one of the vehicles, and the selecting includes identifying, based on the image, which of the vehicles the image is of.

12. The system of claim 11 wherein the server and the application are configured to display, on the captured image, descriptive information about the identified vehicle.

13. The system of claim 12 wherein the descriptive information includes price.

14. The system of claim 1 wherein the detecting of the location is based on GPS.

15. The system of claim 1 wherein the transmitting of the position data is through a cellular network.

16. The system of claim 1 wherein the communication device is configured to transmit its location to the server, and wherein the server is configured to monitor which of the vehicles is near the communication device and to control the communication device to display the model and price of a vehicle determined to be near the communication device vehicle.

17. The system of claim 1 wherein each location detector is configured to be connected to an on-board diagnostics (OBD) port of the respective vehicle, and to receive the vehicle's vehicle identification number (VIN) through the OBD port, and to transmit the VIN when transmitting the vehicle's location.

18. The system of claim 17 wherein the location detector is configured to be powered through the OBD port.

19. The system of claim 1 wherein the server is configured to use the received location data to track inventory of the vehicles.

* * * * *